(12) United States Patent
Vasile et al.

(10) Patent No.: US 11,308,524 B2
(45) Date of Patent: Apr. 19, 2022

(54) RISK-ADJUSTED PREDICTIVE BIDDING FOR ELECTRONIC ADVERTISEMENTS

(71) Applicant: CRITEO SA, Paris (FR)

(72) Inventors: Flavian Vasile, Ivry la Bataille (FR); Damien Lefortier, Ivry la Bataille (FR)

(73) Assignee: Criteo SA, Paris (FR)

( * ) Notice: Subject to any disclaimer, the term of this patent is extended or adjusted under 35 U.S.C. 154(b) by 330 days.

(21) Appl. No.: 15/408,259

(22) Filed: Jan. 17, 2017

(65) Prior Publication Data

US 2018/0204249 A1 Jul. 19, 2018

(51) Int. Cl.
  *G06Q 30/02* (2012.01)
  *G06Q 10/06* (2012.01)

(52) U.S. Cl.
  CPC ..... *G06Q 30/0275* (2013.01); *G06Q 10/0635* (2013.01); *G06Q 30/0277* (2013.01)

(58) Field of Classification Search
  CPC ........... G06Q 30/0276; G06Q 30/0251; G06Q 30/0204; G06Q 30/0206
  USPC ............................................ 705/14.68, 14.78
  See application file for complete search history.

(56) References Cited

U.S. PATENT DOCUMENTS

| | | | |
|---|---|---|---|
| 8,990,105 | B1 | 3/2015 | Shatkin-Margolis et al. |
| 10,282,758 | B1 | 5/2019 | Els et al. |
| 2002/0120504 | A1 | 8/2002 | Gould et al. |
| 2003/0187923 | A1 | 10/2003 | Kimura et al. |
| 2003/0220866 | A1 | 11/2003 | Pisaris-Henderson et al. |
| 2005/0033641 | A1 | 2/2005 | Jha et al. |
| 2006/0041638 | A1 | 2/2006 | Whittaker et al. |
| 2006/0085275 | A1 | 4/2006 | Stokes et al. |
| 2006/0218035 | A1 | 9/2006 | Park et al. |
| 2006/0253319 | A1 | 11/2006 | Chayes et al. |
| 2007/0150353 | A1 | 6/2007 | Krassner et al. |
| 2007/0168506 | A1 | 7/2007 | Douglas et al. |
| 2007/0204014 | A1 | 8/2007 | Greer et al. |
| 2008/0004962 | A1 | 1/2008 | Muthukrishnan et al. |
| 2008/0243592 | A1 | 10/2008 | Song et al. |
| 2009/0024737 | A1 | 1/2009 | Goldspink et al. |
| 2009/0089151 | A1 | 4/2009 | Protheroe et al. |
| 2009/0125719 | A1 | 5/2009 | Cochran et al. |
| 2009/0172091 | A1 | 7/2009 | Hamel |

(Continued)

*Primary Examiner* — Brian M Epstein
*Assistant Examiner* — Reham K Abouzahra
(74) *Attorney, Agent, or Firm* — Proskauer Rose LLP

(57) ABSTRACT

Methods and systems are described herein for risk-adjusted predictive bidding for electronic advertisements. A first computing device receives, from a requesting device loading a webpage, a first request for graphical display source code corresponding to a computerized graphical advertisement display to be inserted into one or more impression opportunities on the webpage. A second computing device coupled to the first computing device transmits a second request to a plurality of third-party computing devices for one or more bids for an impression opportunity of the one or more impression opportunities. The second computing device receives the one or more bids from the third-party computing devices and adjusts at least one of the one or more bids based upon a risk factor received from the third-party computing device that submitted the corresponding bid. The first computing device determines whether to select the impression opportunity based on the adjusted one or more bids.

10 Claims, 4 Drawing Sheets

(56) References Cited

U.S. PATENT DOCUMENTS

| | | |
|---|---|---|
| 2009/0254414 A1 | 10/2009 | Schwarz et al. |
| 2010/0057566 A1 | 3/2010 | Itzhak |
| 2010/0094704 A1 | 4/2010 | Subramanian et al. |
| 2010/0125506 A1 | 5/2010 | Vassilvitskii et al. |
| 2010/0198772 A1 | 8/2010 | Silverman et al. |
| 2010/0217797 A1 | 8/2010 | Kirsch et al. |
| 2011/0035259 A1 | 2/2011 | Das et al. |
| 2011/0087543 A1 | 4/2011 | Coon |
| 2011/0125577 A1 | 5/2011 | Song et al. |
| 2011/0125595 A1 | 5/2011 | Neal et al. |
| 2011/0131099 A1* | 6/2011 | Shields ............. G06Q 30/0275 705/14.71 |
| 2011/0185016 A1 | 7/2011 | Kandasamy et al. |
| 2011/0225637 A1 | 9/2011 | Counterman |
| 2012/0143713 A1 | 6/2012 | Dittus et al. |
| 2012/0173981 A1 | 7/2012 | Day |
| 2012/0271883 A1 | 10/2012 | Montoya et al. |
| 2012/0310729 A1 | 12/2012 | Daito et al. |
| 2015/0019331 A1* | 1/2015 | Chambard ......... G06Q 30/0255 705/14.53 |
| 2015/0302470 A1* | 10/2015 | Dru ....................... G06Q 30/08 705/14.51 |
| 2015/0339704 A1* | 11/2015 | Liu .................... G06Q 30/0247 705/14.46 |
| 2016/0092933 A1* | 3/2016 | Xu .................... G06Q 30/0275 705/14.71 |
| 2016/0275554 A1* | 9/2016 | Yan .................... G06Q 30/0277 |
| 2016/0307236 A1* | 10/2016 | Lidow ............... G06Q 30/0275 |

\* cited by examiner

```
{
  "id": "a453d0945f42d1727a9e0c29e6b",
  "at": 2,
  "tmax": 102,
  "imp": [
    {
      "id": "1",
      "tagid": "390186",
      "secure": 0,
      "iframebuster": [
        "af",
        "mm",
        "wo"
      ],
      "banner": {
        "pos": 3,
        "api": [
        ],
        "topframe": 0,
        "w": 300,
        "h": 250,
        "ext": {
          "sizes": [
            {
              "w": 300,
              "h": 250,
              "fmt": {
                15
              }
            }
          ]
        }
      },
      "instl": 0
    }
  ],
```

```
  "site": {
    "id": "74776",
    "domain": "<URL>",
    "name": "<name>",
    "cat": [
      "IAB12-3",
      "IAB12-2"
    ],
    "page": "<URL>",
    "publisher": {
      "id": "12108"
    }
  },
  "device": {
    "geo": {
      "country": "NLD",
      "region": "UT",
      "zip": "3811 aa",
      "utcoffset": 120
    },
    "ext": {
      "xiff": ""
    },
    "ip": "<ip address>",
    "js": 1,
    "language": "nl",
    ...
  },
  "user": {
    "id": "e4bc92f83472a34c019a21d058f",
    "buyeruid": "97c1c626-86a4085783f0",
    ...
  }
  ...
}
```

FIG. 3

```
{
  "id": " a453d0945f42d1727a8e0c29e6b",
  "seatbid": [
    {
      "seat": "<seat>",
      "bid": [
        {
          "adm": "<iframe id='2deb4c18' name='2deb4c18'
                   src='<URL>...'
                   width='300' height='250'></iframe>",
          "adomain": [
            "<domain name>"
          ],
          "id": 1,
          "impid": "1",
          "price": 0.37,
          "alpha": 0.5,           ← 402
          "cid": "84723",
          "adid": "18865",
          "crid": "4369231",
          "ext": {
            "nt": "C7quxE6R4h9tnjsebtjTw8erQ-piliKxvqN..."
          }
        }
      ]
    }
  ],
  "cur": "USD"
}
```

FIG. 4

RISK-ADJUSTED PREDICTIVE BIDDING FOR ELECTRONIC ADVERTISEMENTS

TECHNICAL FIELD

The present technology relates to electronic advertisements, and, more particularly, to techniques for risk-adjusted predictive bidding for electronic advertisements.

BACKGROUND

Publisher systems can provide webpages or other online content that can include one or more advertisement display opportunities for computerized graphical advertisement displays (e.g., space for a banner advertisement across the top of the webpage, within an application, or within other media such as videos or images). In some instances, when a user device (e.g., a computer running a web browser) processes a webpage for display, the user device can request, from an ad system, graphical display source code for a computerized graphical advertisement display for one of the advertisement display opportunities. The ad system can provide the graphical display source code to the user device to render and/or display.

As part of the advertisement selection process, the ad system communicates with real-time bidding (RTB) computing platforms. The RTB platforms receive bids from various third-party bidding agent systems (also called demand-side platforms (DSP)) that submit bids for the advertisement display opportunity on behalf of advertisers. Typically, the bidding agent systems are responsible for generating a bid for advertisement opportunities that meet the advertiser's requirements, such as cost, value, and audience considerations. The RTB platforms coalesce the bids received from the various DSPs and determine whether the advertisement display opportunity is selected after analyzing the received bids.

Generally, the RTB systems and DSPs operate under the assumption that advertisers are risk neutral when it comes to bidding on and selecting advertisement display opportunities and thus, bids are generated based upon an expected value to the advertiser. However, in some situations, certain advertisers may be actually be risk averse (e.g., the advertiser is a small entity with limited advertising resources, the advertiser offers high-priced items for sale that have a low conversion rate) and thus the bids submitted on behalf of such advertisers by the RTB systems and DSPs do not accurately reflect the advertiser's risk tolerance.

SUMMARY

Accordingly, there is a need for technology to dynamically and programmatically incorporate an advertiser's preferred risk tolerance into the computerized advertisement bidding process so that advertisers can submit bids according to their individual risk tolerance and accordingly receive an improved return on investment (ROI) for their advertising dollars.

In one aspect, there is a computerized method for risk-adjusted predictive bidding for electronic advertisements. A first computing device receives, from a requesting device loading a webpage, a first request for graphical display source code corresponding to a computerized graphical advertisement display to be inserted into one or more impression opportunities on the webpage. A second computing device coupled to the first computing device transmits a second request to a plurality of third-party computing devices for one or more bids for an impression opportunity of the one or more impression opportunities. The second computing device receives the one or more bids from the plurality of third-party computing devices. The second computing device adjusts at least one of the one or more bids based upon a risk factor received from the third-party computing device that submitted the corresponding bid. The second computing device determines whether to select the impression opportunity based on the adjusted one or more bids. The first computing device generates graphical display source code based upon a bid of the adjusted one or more bids for display on the requesting device.

The above aspect can include one or more of the following features. In some embodiments, the adjusting step comprises lowering the bid based upon the risk factor. In some embodiments, the risk factor represents a risk that the computerized graphical advertisement display inserted into the impression opportunity is not interacted with by a user of the webpage. In some embodiments, the interaction with the computerized graphical advertisement display comprises a click of the computerized graphical advertisement display, a sale of a product represented in the computerized graphical advertisement display, or viewability information associated with the computerized graphical advertisement display.

In some embodiments, the risk factor is based upon an expected long-term value to an advertiser associated with the third-party computing device that submitted the corresponding bid. In some embodiments, the risk factor is based upon a risk preference indicator received from the third-party computing device by the second computing device as part of the corresponding bid. In some embodiments, the risk preference indicator identifies whether an advertiser associated with the third-party computing device is risk-sensitive.

In some embodiments, the second computing device and the third-party computing devices communicate with each other using a predefined API interface. In some embodiments, if the impression opportunity is selected, the first computing device stores advertisement information related to the impression opportunity. The first computing device generates graphical display source code for a computerized graphical advertisement display based upon the advertisement information and indicia of an advertiser associated with the third-party computing device that submitted the selected bid. The first computing device provides the graphical display source code to the requesting device. In some embodiments, the requesting device renders the graphical display source code to display the computerized graphical advertisement display.

In some embodiments, the second computing device determines a value associated with selecting the impression opportunity. The second computing device determines a largest bid of the adjusted one or more bids and selects the impression opportunity using the largest bid if the value associated with selecting the impression opportunity is greater than or equal to a cost associated with selecting the impression opportunity.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which:

FIG. 3 is a diagram of an exemplary bid request message.

FIG. 4 is a diagram of an exemplary bid response message.

DETAILED DESCRIPTION

The present technology provides systems and methods for risk-adjusted predictive bidding for electronic advertisements, particularly computerized graphical display advertisements. Although the technology is illustrated and described herein with reference to specific embodiments, the technology is not intended to be limited to the details shown. Various modifications can be made in the details within the scope the claims and without departing from the technology.

Figure 1:
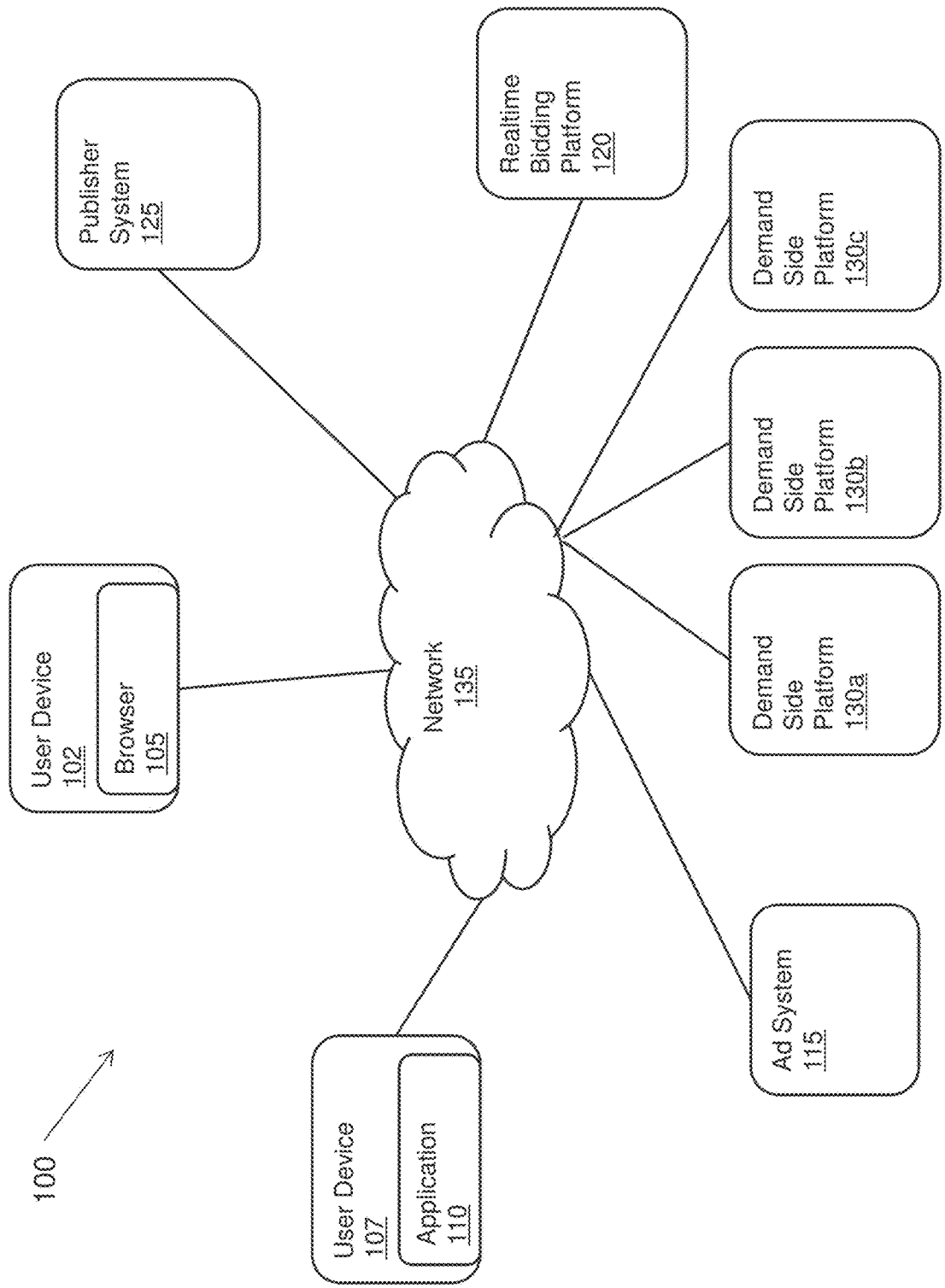
FIG. 1 is a diagram of a networked system in accordance with embodiments of the technology.

FIG. 1 is a diagram of networked system 100 in accordance with embodiments of the technology. As illustrated, networked system 100 can include user device 102, user device 107, ad system 115, RTB platform 120, publisher system 125, and DSPs 130a-130c. User device 102, user device 107, ad system 115, RTB platform 120, publisher system 125, and DSPs 130a-130c can be in data communication via network 135. User devices 102 and 107 can each be any computing devices. In some embodiments, user devices 102 and 107 can each be one of a mobile computing device (e.g., cellular phones and/or tablets), a PC, or other computing device. User device 102 executes web browser 105. User device 107 executes application 110 (e.g., a mobile application that interacts with online content).

Ad system 115 can be any computing device, such as a server or multiple servers. In some embodiments, ad system 115 can collect behavioral data for a plurality of devices, browsers, and/or applications. In some embodiments, ad system 115 can receive behavioral data for a plurality of devices, browsers, and/or applications from third-parties. In some embodiments, ad system 115 can provide graphical display source code for a computerized graphical advertisement display in accordance with the present technology.

RTB platform 120 can be any computing device, such as a server or multiple servers. In some embodiments, RTB platform 120 can perform auctions for advertising display opportunities in online media, such as webpages or application content served by publisher system 125, that are provided to user devices 102 and/or 107. Ad system 115 can submit bids for such advertising opportunities, and if ad system 115 wins the auction, ad system 115 can provide source code or other display data for a computerized graphical advertisement display to fill the advertising display opportunity. Publisher system 125 can be any computing device, such as a server or multiple servers. In some embodiments, publisher system 125 can serve webpages to browser 105. In some embodiments, publisher system 125 can serve other content to application 110. In some embodiments, publisher system 125 can communicate with ad system 115 to determine whether ad system 115 will provide source code for a computerized graphical advertisement display to fill an advertisement display opportunity in a webpage or application content.

DSPs 130a-130c can be any computing device, such as a server or multiple servers. In some embodiments, DSPs 130a-130c can receive bid requests from RTB platform 120 and generate bids on behalf of advertisers, which the DSPs 130a-130c then submit to the RTB platform in response to the bid requests. In some embodiments, the DSPs 130a-130c and RTB platform 120 communicate using a specialized application programming interface (API), using specifically-formatted data requests and responses. Network 135 can be any network or multiple networks. For example, network 135 can include cellular networks through which user devices 102 and 107 are connected and the Internet.

Figure 2:
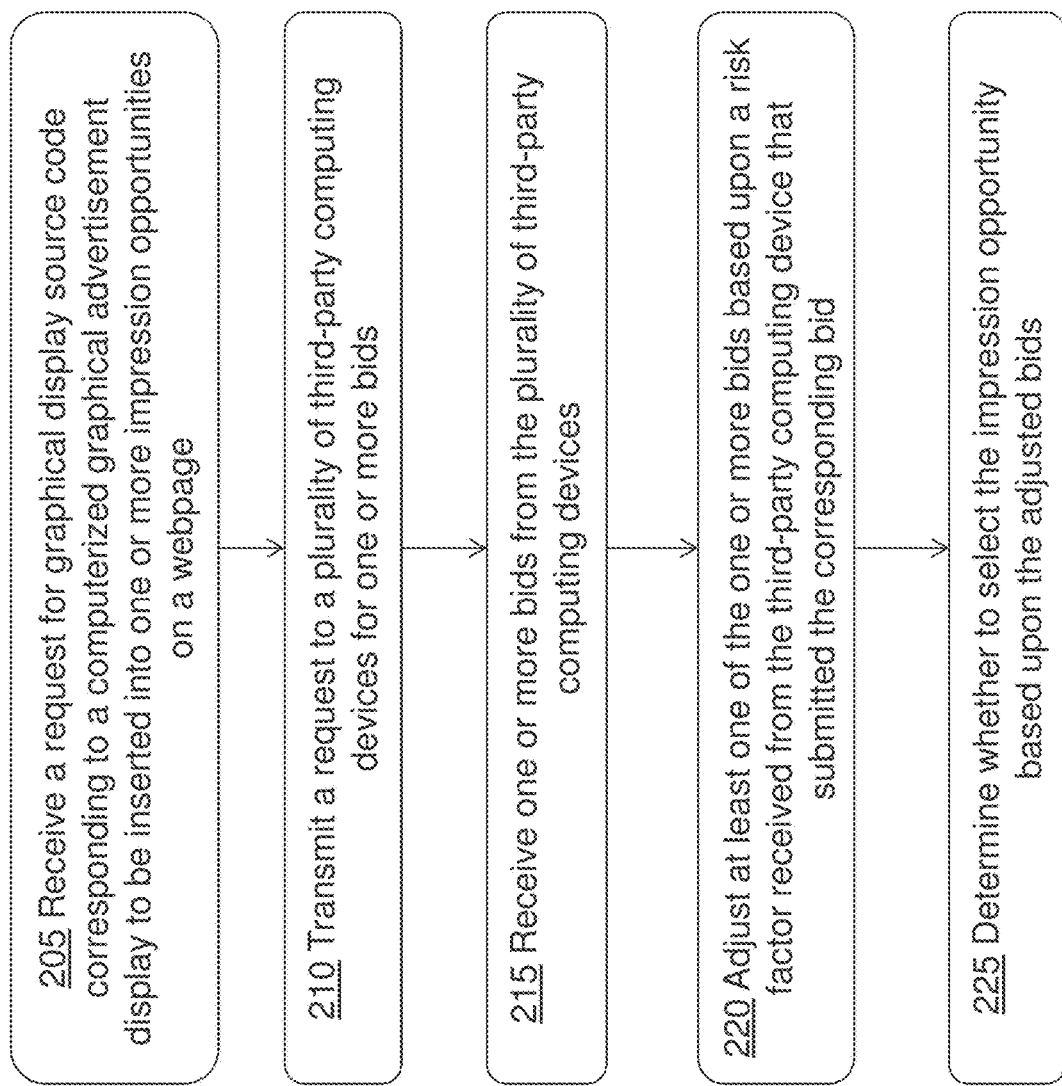
FIG. 2 depicts a flow chart for risk-adjusted predictive bidding for electronic advertisements.

FIG. 2 is a flow diagram of a method of risk-adjusted predictive bidding for electronic advertisements, using the system 100 of FIG. 1. An ad system (e.g., ad system 115) receives a request for graphical display source code for a computerized graphical advertisement display to be inserted into one or more impression opportunities on a webpage. The request can be received from a browser or other application executing on a user device (e.g., browser 105 on user device 102) on which the webpage is displayed. The ad system transmits the request to the real-time bidding platform 120 for requisition of corresponding bids for the impression opportunities from the DSPs 130a-130c.

At step 210, the RTB platform transmits a request to the DSPs for one or more bids. Generally, each of the DSPs bids on behalf of an advertiser that wishes to insert a graphical advertisement into the impression opportunities on the webpage. In one embodiment, the DSPs initiate an API call to one or more of advertiser computing devices, where the API call includes a bid request message. FIG. 3 is an exemplary bid request message, generated by the API interface executing on the DSP, for receipt and processing by the advertiser computing device. As shown in FIG. 3, the bid request message includes data elements relating to, e.g., the impression opportunity (type, position, size), the website, the publisher, the requesting device, and a user of the device. It should be appreciated that the bid request message in FIG. 3 is just one embodiment of the structure of a bid request message used in the system 100 described herein, and other structures and data elements can be included in the bid request message without departing from the scope of invention.

The respective advertiser computing devices use the data elements contained in the bid request message to generate a responsive bid for submission to the DSP. FIG. 4 is an exemplary bid response message, generated by the API interface executing on the advertiser computing device, for submission to the DSP. As shown in FIG. 4, the bid response message includes data elements relating to, e.g., the submitted bid (price, currency), the graphical advertisement to be displayed, and so forth. The bid response message further includes a parameter 402 that specifies the risk tolerance level (or risk aversion level) of the advertiser. In FIG. 4, the parameter 402 is labeled 'alpha' and can be set by the DSP to a value between 0 and 1, where 0=risk neutral and 1=fully risk averse.

At step 215 of FIG. 2, the DSP receives the bid response messages, which each includes a corresponding bid as described above, from the advertiser computing devices via the API interface. The DSP processes the bid response messages to utilize the risk tolerance parameter in adjusting the received bid, as described below.

As mentioned previously, an optimal risk-neutral bidding strategy can be to generate a bid based upon an expected value to the advertiser:

$$bid = eCPM = CPA \times p(\text{click}) \times p(\text{sale}|\text{click})$$

where:

eCPM is expected cost per thousand impressions;

CPA is cost per action (sale) (i.e., the amount the advertiser is willing to spend on advertising to get one sale)—CPA can be estimated as cost-per-click (CPC) divided by the average conversion rate that the advertiser observed in the past;

p(click) is the probability of a click on the advertising impression; and p(sale|click) is the probability of a sale given a click on the advertising impression.

In order to adjust the bid, the DSP can incorporate the risk tolerance parameter received from the advertiser computing device in the bid response message:

$$bid_{adj} = eCPM_{adj} = CPA \times p(click) \times p(sale|click) \times (1 - \alpha \times stdev(p(sale|click)))$$

where:

$\alpha$ is the risk tolerance parameter (i.e., a numeric value between 0 and 1); and stdev(p(sale|click))) is the standard deviation of the probability of a sale given a click on the advertising impression.

In another example, the DSP can take into account the risk in the prediction variance of p(sale|click) by directly computing the quantile of the p(sale|click) corresponding to the desired risk level via quantile regression.

As a result, the bid is adjusted lower in circumstances where the probability of a sale given a click is more uncertain (i.e., has a wider dispersion or range of values).

At step 220, the DSP adjusts at least one of the one or more bids received from the advertiser computing devices using the associated risk tolerance parameters as received in the bid response messages. At step 225, based upon the adjusted bids the DSP determines whether to select the impression opportunity (i.e., submit a bid to the RTB system for the impression opportunity). If the DSP selects the impression opportunity, the RTB system receives the bid from the DSP and generates graphical display source code to be inserted into the impression opportunity. The RTB system transmits the graphical display source code to the ad system for display on the user device.

As described above, the advertiser computing devices submit the risk tolerance parameter as part of the bid response messages. It should be appreciated that the systems and methods described herein can utilize other techniques to recognize an advertiser's risk tolerance and to adjust submitted bids accordingly. In one example, the risk tolerance parameter can be a binary value that indicates whether the advertiser is risk averse (e.g., 0=not risk averse; 1=risk averse). Upon receiving the indicator as part of the bid response message, the DSP can determine a value (i.e., alpha) for the advertiser's risk tolerance using historical information about the advertiser, its bids, conversion rates, and so forth.

In another example, the DSP can determine the value of the risk tolerance parameter for a particular advertiser—without receiving any specific input from the advertiser computing device—based on, for example, the campaign budget and the target CPA, which together can be used to estimate the targeted number of conversions. In the case of advertisers with low targets on the number of conversions and high CPAs, the bid adjustment can be applied automatically because such advertisers have a high risk. This leads to a similar effect with budget smoothing strategies that spread the budget spend over the entire billing cycle. In the case of risk-based bid adjustments, the display traffic that will be bought has a higher than average conversion rate—leading to a higher ROI for the advertiser at the cost of a slower spend rate.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application specific-integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A computerized method for risk-adjusted predictive bidding for electronic advertisements during loading of a webpage, the method comprising:
   receiving, by a first computing device from a software application of a requesting device during loading of a webpage, a first request for graphical display source code corresponding to a computerized graphical advertisement display to be inserted into one or more impression opportunities on the webpage;
   transmitting, by a second computing device coupled to the first computing device, during loading of the webpage by the requesting device, a second request to a plurality of third-party computing devices for one or more bids for an impression opportunity of the one or more impression opportunities;
   receiving, by the second computing device, during loading of the webpage by the requesting device, the one or more bids from the plurality of third-party computing devices;
   adjusting, by the second computing device, during loading of the webpage by the requesting device, at least one of the one or more bids based upon a risk tolerance parameter ($\alpha$) received from the third-party computing device that submitted the corresponding bid, wherein the risk tolerance parameter ($\alpha$) as received is encoded as a key-value pair in a message returned from the third-party computing devices in response to an application programming interface (API) call initiated by the second computing device, and including:
      applying the risk tolerance parameter ($\alpha$) received from the third-party computing device to a bid adjustment algorithm, wherein the risk tolerance parameter ($\alpha$) modifies a standard deviation value associated with a probability of a sale given an interaction with the impression opportunity by a user of the webpage, wherein the bid adjustment algorithm is $$CPA \times p(\text{click}) \times p(\text{sale}|\text{click})$$

where CPA is cost per action, p(click) is a probability of a click on the advertising impression, and p(sale|click) is a probability of a sale given a click on the advertising impression, and
   wherein the risk tolerance parameter ($\alpha$) is applied to the bid adjustment algorithm as:

$$CPA \times p(\text{click}) \times p(\text{sale}|\text{click}) \times (1-\alpha \times \text{stdev}(p(\text{sale}|\text{click})))$$

where stdev(p(sale|click)) is the standard deviation of the probability of a sale given a click on the advertising impression;
   determining, by the second computing device, during loading of the webpage by the requesting device, whether to select the impression opportunity based on the adjusted one or more bids; and
   generating, by the first computing device, during loading of the webpage by the requesting device, graphical display source code based upon a bid of the adjusted one or more bids for display on the requesting device in the webpage upon completion of loading of the webpage.

2. The method of claim 1, wherein the adjusting step comprises lowering the bid based upon the risk factor.

3. The method of claim 1, wherein the risk tolerance parameter ($\alpha$) represents a risk that the computerized graphical advertisement display inserted into the impression opportunity is not interacted with by a user of the webpage.

4. The method of claim 1, wherein the interaction with the computerized graphical advertisement display comprises a click of the computerized graphical advertisement display, or a view associated with the computerized graphical advertisement display.

5. The method of claim 1, wherein the risk tolerance parameter ($\alpha$) is based upon an expected long-term value to an advertiser associated with the third-party computing device that submitted the corresponding bid.

6. The method of claim 1, wherein the risk tolerance parameter ($\alpha$) is based upon a risk preference indicator received by the second computing device from the third-party computing device as part of the corresponding bid.

7. The method of claim 6, wherein the risk preference indicator identifies whether an advertiser associated with the third-party computing device is risk-sensitive.

8. The method of claim 1, further comprising:
   when the impression opportunity is selected:
      storing, by the first computing device, advertisement information related to the impression opportunity;
      generating, by the first computing device, graphical display source code for a computerized graphical advertisement display based upon the advertisement information and indicia of an advertiser associated with the third-party computing device that submitted the selected bid; and
      providing, by the first computing device, the graphical display source code to the requesting device.

9. The method of claim 8, further comprising:
   rendering, by the requesting device, the graphical display source code to display the computerized graphical advertisement display.

10. The method of claim 1, further comprising:
   determining, by the second computing device, a value associated with selecting the impression opportunity;
   determining, by the second computing device, a largest bid of the adjusted one or more bids; and
   selecting, by the second computing device, the impression opportunity using the largest bid if the value associated with selecting the impression opportunity is greater than or equal to the cost associated with selecting the impression opportunity.

* * * * *